(12) United States Patent
Eckelberry

(10) Patent No.: US 6,384,716 B1
(45) Date of Patent: May 7, 2002

(54) TRAILER SLIDER REPOSITIONING ALARM

(75) Inventor: Jim Eckelberry, Canton, OH (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/518,940

(22) Filed: Mar. 6, 2000

(51) Int. Cl.$^7$ .............................................. G08B 21/00
(52) U.S. Cl. .................... 340/431; 340/438; 280/407.1; 180/209
(58) Field of Search ................................ 340/431, 438, 340/425.5, 440; 280/407.1; 180/209

(56) References Cited

U.S. PATENT DOCUMENTS

| | | | |
|---|---|---|---|
| 5,314,201 A | 5/1994 | Wessels | 280/407.1 |
| 5,364,113 A | * 11/1994 | Goertzen | 280/81.6 |
| 5,460,237 A | * 10/1995 | Schueman | 180/209 |
| 6,105,981 A | * 8/2000 | Buelt et al. | 280/86.751 |

* cited by examiner

Primary Examiner—Daniel J. Wu
Assistant Examiner—Sihong Huang
(74) Attorney, Agent, or Firm—Carlson Gaskey & Olds

(57) ABSTRACT

A suspension repositioning system for a trailer is provided that includes a trailer frame having spaced apart rails with a plurality of sets of holes in the rails. A suspension unit is movable relative to the frame along the rails. The suspension unit has a set of pins movable between locked and unlocked positions which are engageable with one of the plurality of sets of holes in the locked position to secure the suspension unit to the trailer frame. A speed sensor detects a speed of the suspension unit, and a pin position sensor detects the unlocked position of at least one of the pins. An alarm is connected with the speed sensor and the pin position sensor. The alarm sends an alert signal in response to the speed sensor detecting a predetermined speed and the pin position sensor detecting the at least one of the pins in the unlocked position.

19 Claims, 3 Drawing Sheets

TRAILER SLIDER REPOSITIONING ALARM

BACKGROUND OF THE INVENTION

This invention relates to a trailer that has a slideable suspension unit, and more specifically, the invention relates to an alarm for indicating when the suspension unit is not locked into the trailer.

Some trailers have suspension units that are slideable relative to the trailer so that the suspension unit may be repositioned to better bear the trailer load. The suspension unit may be moved incrementally forward and rearward between a plurality of discrete positions. The trailer includes a frame with a pair of spaced apart rails with sets of holes that define each of the discrete positions. The suspension unit typically has two pairs of pins with each pair of pins cooperating with a set of holes to lock the suspension unit to the trailer. The pins are movable between an unlocked or retracted position and a locked or extended position in which the pins are received within the holes.

The trailer frame includes a pair of spaced apart stop bars extending between the rails that limit the amount the suspension unit may be repositioned forward and rearward. One of the stop bars is movable to assist an operator is aligning the pins with the sets of holes for the desired discrete position. The operator repositions the suspension unit by actuating the brakes for the wheels on the suspension unit and unlocking the pins. The operator then drives the trailer forward or rearward using the tractor until the suspension unit engages the stop bar. The operator actuates the pins to the locked position to secure the suspension unit to the trailer. Occasionally, the pins fail to filly engage the holes and the suspension unit is not filly secured to the trailer, which may be difficult for the operator to detect. As the trailer travels down the road, the suspension unit may move forward or rearward relative to the trailer until it slams into a stop bar, usually severely damaging the trailer. Therefore, what is needed is a trailer slider positioning alarm that alerts the operator when the suspension unit is not fully secured to the trailer.

SUMMARY OF THE INVENTION AND ADVANTAGES

The present invention provides a suspension repositioning system for a trailer that includes a trailer frame having spaced apart rails with a plurality of sets of holes in the rails. A suspension unit is movable relative to the frame along the rails. The suspension unit has a set of pins movable between locked and unlocked positions which are engageable with one of the plurality of sets of holes in the locked position to secure the suspension unit to the trailer frame. A speed sensor detects a speed of the suspension unit, and a pin position sensor detects the unlocked position of at least one of the pins. An alarm is connected with the speed sensor and the pin position sensor. The alarm sends an alert signal in response to the speed sensor detecting a predetermined speed and the pin position sensor detecting the at least one of the pins in the unlocked position.

Accordingly, the above invention provides a trailer slider positioning alarm that alerts the operator when the suspension unit is not fully secured to the trailer.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
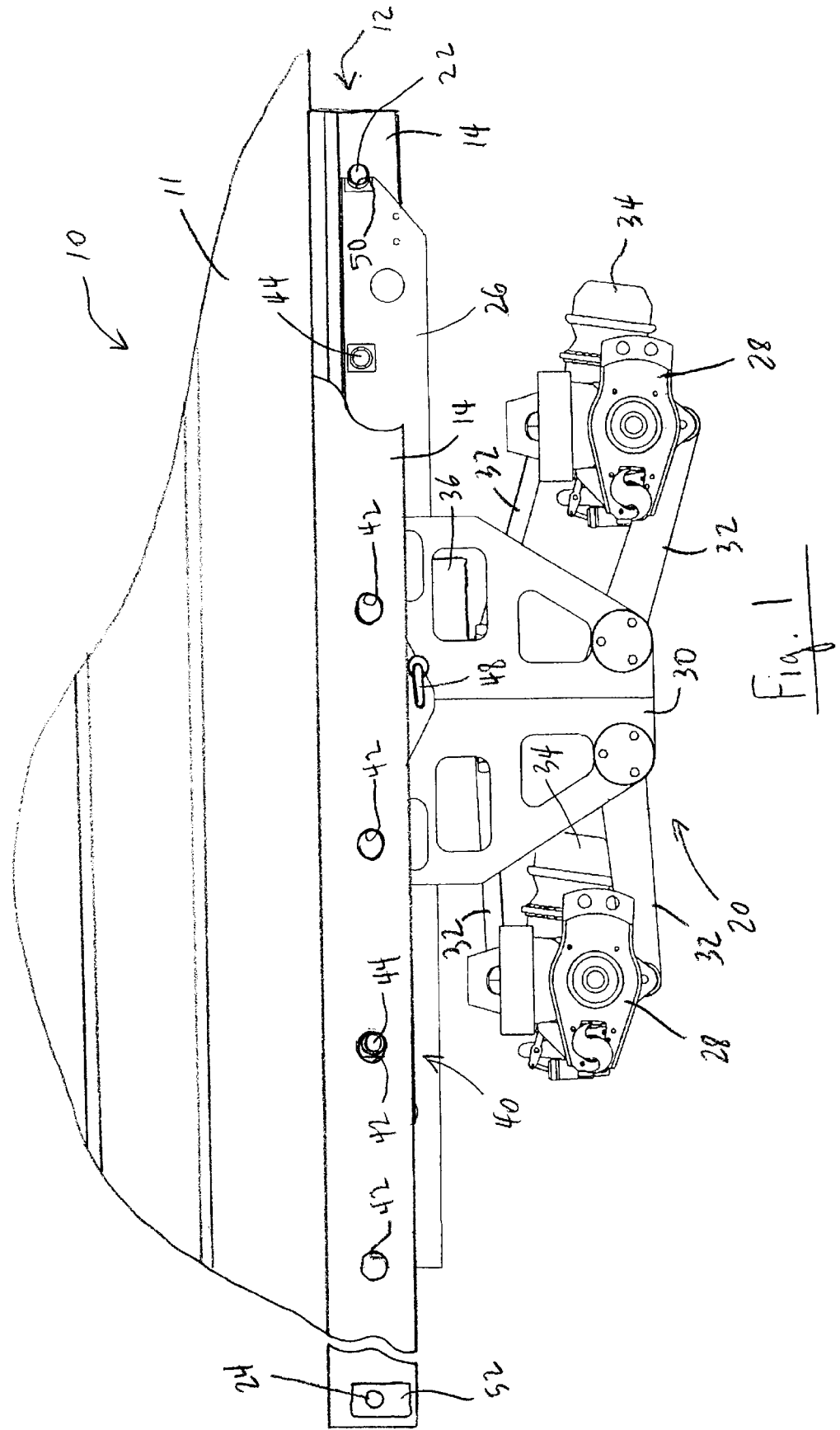
FIG. 1 is a side elevational view of a trailer with a slideable suspension unit of the present invention.
Figure 2:
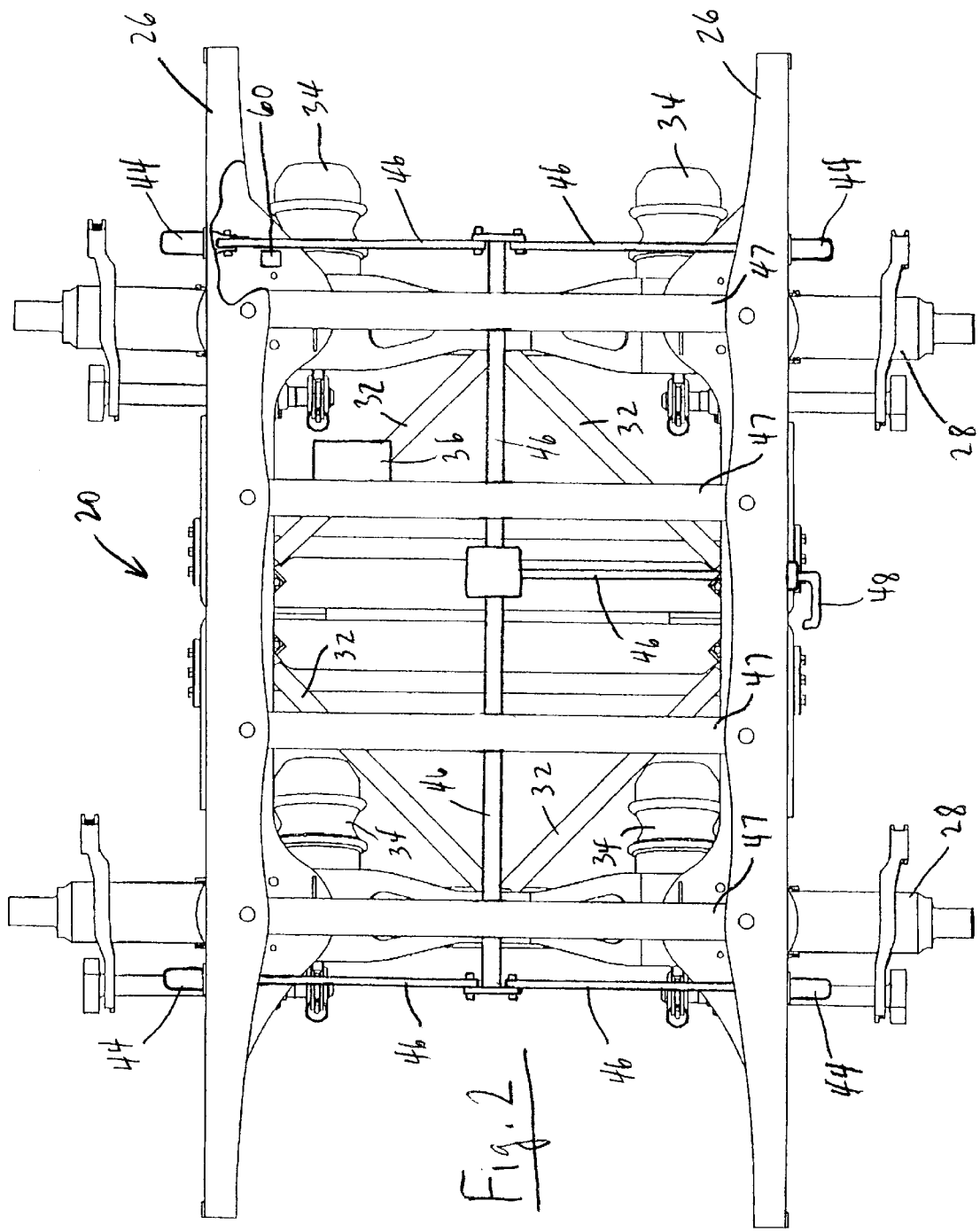
FIG. 2 is a top elevational view of the suspension unit of the present invention.
Figure 3:
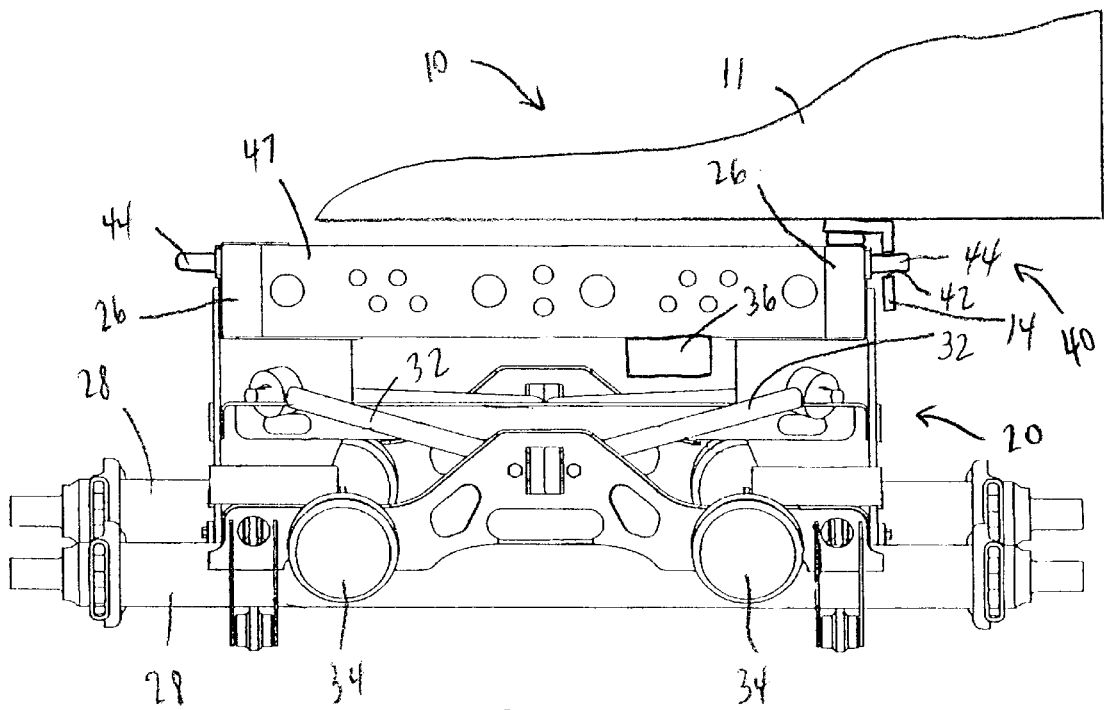
FIG. 3 is a rear elevational view of the trailer and suspension unit shown in FIG. 1.

Referring to FIGS. 1–3, a trailer 10 has a cargo carrying structure 11 supported on a frame 12 that includes spaced apart rails 14 extending longitudinally along the trailer 10. A suspension unit 20 is positioned between the rails 14 and is movable relative to the frame 12 along the rails 14. The suspension unit 20 may be moved forward or rearward to reposition the suspension unit 20 to a location better suited for carrying the load in the cargo carrying structure 11. A pair of stop bars 22, 24 are disposed between the rails 14 and are in spaced relation from one another. The suspension unit 20 is interposed between the stop bars 22, 24 with the stop bars 22, 24 defining an area of adjustment. Typically, one of the stop bars 22 is welded in place between the rails 14, and the other stop bar 24 is movable for assisting an operator while repositioning the suspension unit 20, which will be described in more detail below.

The suspension unit 20 includes slider members 26 adjacent to the rails 14. Supports 30 and suspension linkages 32 support tandem axles 28 on the slider members 26. The axles 28 carry wheels (not shown) that are braked by air brake chambers 34. The suspension unit 20 has an anti-lock braking (ABS) module 36, schematically shown in the Figures, which cooperates with the brake chambers 34 to provide controlled braking of the wheels based upon various vehicle information. Although the ABS module 36 is shown supported on the suspension unit 20, it may be located anywhere on the tractor or trailer.

As mentioned above, the suspension unit 20 is movable forward and rearward relative to the frame 12. As a result, the trailer 10 requires a suspension repositioning system 40 that has a locking system to secure the suspension unit 20 to the frame 12. To this end, the rails 14 include a plurality of sets of holes 42 that define discrete positions. The suspension unit 20 has a set of pins 44, typically two pairs of opposing pins, movable between locked and unlocked positions. Each set of pins 44 is engageable with a set of holes 42 when in the locked position to secure the suspension unit 20 to the trailer frame 12. The pins 44 are mechanically connected by a set of linkages 46, which are supported by cross-members 47, that may be manually actuated by a handle 48. However, it is to be understood that the pins 44 may be actuated in any other suitable manner, such as electrically, pneumatically, or hydraulically. Also, the pins 44 may be located on the frame 12 and the holes 42 may be located on the slider member 26 if desired.

Each end of the slider members 26 include a recess 50 that cooperates with the stop bars 22, 24 to align the pins 44 with their corresponding hole 42. As mentioned above, the stop bar 24 is movable to assist in aligning the pins 44 with the holes 42. The stop bar 24 has a flange 52 at one end and a detent pin at the other end to retain the stop bar 24 on the rails 14. The stop bar 24 may be removed from a set of holes 42 by removing the detent pin and pulling the stop bar 24 out. The stop bar 24 may then be inserted in a different set of holes 42 until the flange 52 abuts the rail 14, and the detent pin may be reinstalled. When the suspension unit 20 is being repositioned, which is discussed in detail below, the trailer 10 is moved until the recess 50 in the slider members 26 become seated against the stop bar 24 or 22.

The operator repositions the suspension unit 20 by actuating the brakes 34 for the wheels on the suspension unit 20 so that the suspension unit 20 will not roll forward or rearward relative to the ground. The operator must unlock the pins 44 so that they are disengaged from the holes 42 permitting the suspension unit 20 to move relative to the frame 12. The stop bar 24 is positioned to the desired location in the manner described above. If the suspension unit 20 is being moved to its most rearward position, the stop bar 24 need not be moved. The operator then drives the trailer 10 forward or rearward, typically at very low speed (usually under five miles per hour), until the recesses 50 on suspension unit 20 engages the stop bar 24 or 22 thereby aligning the pins 44 with the corresponding holes 42. The operator actuates the pins 44 to the locked position (best shown in FIG. 3) to secure the suspension unit 20 to the frame 12.

Figure 4:
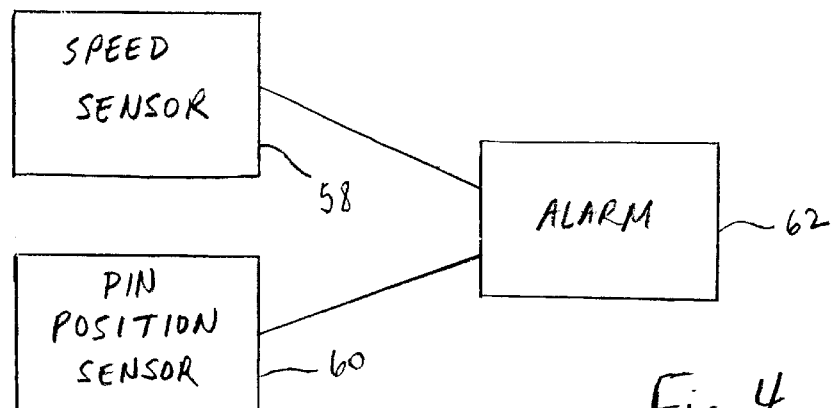
FIG. 4 is a schematic view of a trailer slider reposition alarm of the present invention.

Occasionally, the pins 44 fail to fully engage the holes 42, and the suspension unit 20 is not fully secured to the trailer frame 12, which may be difficult for the operator to detect. As the trailer travels down the road, the suspension unit 20 may move forward or rearward relative to the trailer frame 12 until it slams into a stop bar 22, 24, usually severely damaging a portion of the trailer 10. The present invention utilizes a speed sensor 58 in conjunction with a pin position sensor 60 and an alarm 62, schematically shown in FIG. 4, to signal the operator when the suspension unit 20 is not secured to the frame 12 before the trailer 10 begins travelling at speeds that may cause significant damage.

The speed sensor 58 detects a speed of the suspension unit 20 at the wheels using the ABS module, which detects speed as part of its anti-lock braking function. However, a separate speed sensor 58 may be used, and the speed sensor 58 may detect the speed of the tractor wheels or other trailer wheels. The speed sensor 58 sends a signal to the alarm 62 when a predetermined speed has been reached, preferably approximately five miles per hour. In this way, the speed sensor 58 distinguishes between wheel movement associated with repositioning the suspension unit 20 and the trailer 10 travelling down the road. The pin position sensor 60 detects the unlocked position of at least one of the pins 44. The pin position sensor 60 may include a mechanical switch, or any other suitable type of switch, that coacts with one or more pins 44 when they are either in the locked or unlocked position. The pin position sensor 60 sends a signal to the alarm 62 when the pin 44 are unlocked. A controller may be used with the speed sensor 58, pin position sensor 60, and alarm 62 to send the desired signals to actuate the alarm 62.

The alarm 62 sends an alert signal to the operator in response to the speed sensor 58 detecting the predetermined speed and the pin position sensor 60 detecting the pins 44 in the unlocked position. The alarm 62 may be located in the tractor cab, and the alert signal may be a warning light or an audible noise. In this manner, the operator is alerted of when the trailer is travelling in excess of five miles per hour with the suspension unit 20 unsecured from the frame 12, and, unnecessary damage to the trailer 10 may be avoided.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A suspension repositioning system for a trailer comprising:
   a trailer frame having spaced apart rails with a plurality of sets of holes in said rails;
   a suspension unit movable relative to said frame along said rails, said suspension unit having a set of pins movable between locked and unlocked positions and engageable with one of said plurality of sets of holes in said locked position to secure said suspension unit to said trailer frame;
   a speed sensor for detecting a speed of the suspension unit;
   a pin position sensor for detecting said unlocked position of at least one of said pins; and
   an alarm in connection with said speed sensor and said pin position sensor, said alarm sending an alert signal in response to said speed sensor detecting a predetermined speed and said pin position sensor detecting said at least one of said pins in said unlocked position.

2. The system according to claim 1, wherein said speed sensor comprises a portion of an anti-lock braking system module.

3. The system according to claim 1, wherein said predetermined speed is approximately five miles per hour.

4. The system according to claim 1, wherein said alarm is located in a cab of the trailer.

5. The system according to claim 4, wherein said alert signal is an audible noise.

6. The system according to claim 1, further comprising a pair of stop bars disposed between said rails and in spaced relation from one another, said suspension unit interposed between said stop bars with said stop bars defining an area of adjustment.

7. The system according to claim 6, wherein said suspension unit includes tandem axles.

8. The system according to claim 6, further including a second set of pins movable between locked and unlocked positions and engageable with another of said plurality of sets of holes in said unlocked position.

9. The system according to claim 1, wherein said pin position sensor comprises a mechanical switch that coacts with said pin in said unlocked position.

10. A suspension repositioning system for a trailer comprising:
    a trailer frame having spaced apart rails with a first locking member;
    a suspension unit movable relative to said frame along said rails, said suspension unit having a second locking member engageable with said first locking member in a locked position to secure said suspension unit to said trailer frame;
    a speed sensor for detecting a speed of the suspension unit;
    a locking member position sensor for detecting an unlocked position in which said first and said second locking members are unengaged; and
    an alarm in connection with said speed sensor and said locking member position sensor, said alarm sending an alert signal in response to said speed sensor detecting a predetermined speed and said locking member position sensor detecting said unlocked position.

11. The system according to claim 10, wherein said first locking member comprises a plurality of sets of holes in said rails, and said second locking member comprises a set of pins movable between said locked and unlocked positions.

12. The system according to claim 11, wherein said pin position sensor comprises a mechanical switch that coacts with said pin in said unlocked position.

13. The system according to claim 10, wherein said speed sensor comprises a portion of an anti-lock braking system module.

14. The system according to claim 10, wherein said predetermined speed is approximately five miles per hour.

15. A method of indicating a position of a suspension unit relative to a trailer frame, the steps comprising:

a) providing a locking assembly between the suspension unit and the trailer frame, the locking assembly having an unlocked position and a locked position in which the suspension unit is secured to the trailer frame;

b) detecting the unlocked position;

c) detecting a speed of the suspension unit; and d) alerting a vehicle operator when the speed reaches a predetermined speed and when the locking assembly is in the unlocked position.

16. The method according to claim 15, wherein the locking assembly includes a plurality of sets of holes in the trailer frame and a set of pins movable between the locked and unlocked positions, the set of pins engageable with one of the plurality of sets of holes in the locked position.

17. The method according to claim 16, wherein step b) includes a pin actuating a mechanical switch in the unlocked position.

18. The method according to claim 15, wherein step c) includes sensing a wheel speed of a wheel on the suspension unit with a portion of an anti-lock braking system module.

19. The method according to claim 1 wherein step d) includes producing an audible noise.

* * * * *

UNITED STATES PATENT AND TRADEMARK OFFICE
CERTIFICATE OF CORRECTION

PATENT NO. : 6,384,716 B1
DATED : May 7, 2002
INVENTOR(S) : Eckelberry

It is certified that error appears in the above-identified patent and that said Letters Patent is hereby corrected as shown below:

<u>Column 6,</u>
Line 16, "1" should be -- 15 --.

Signed and Sealed this

Twenty-fifth Day of March, 2003

JAMES E. ROGAN
*Director of the United States Patent and Trademark Office*